Patented Apr. 3, 1928.

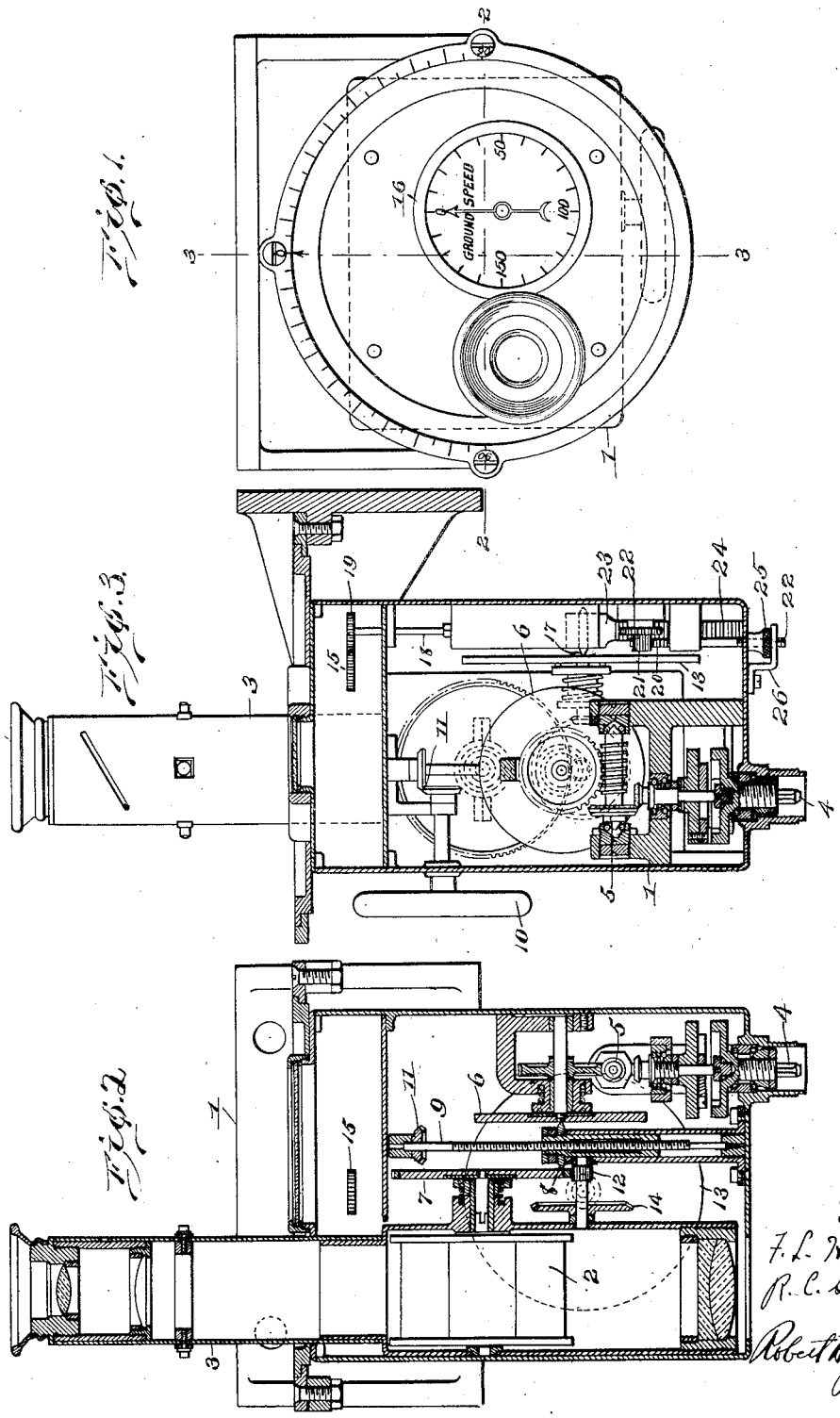

1,664,454

UNITED STATES PATENT OFFICE.

FRANKLIN L. HUNT AND ROY C. SYLVANDER, OF WASHINGTON, DISTRICT OF COLUMBIA.

AIRCRAFT GROUND-SPEED INDICATOR.

Application filed October 19, 1923. Serial No. 669,618.

This invention relates to ground speed measuring devices and more particularly to such as employ a rotating prism for viewing purposes of the ground traversed.

Heretofore in measuring ground speeds, when at a given altitude, a rotating prism has been employed to produce a drift component in the optical field of a telescope or the like, in order to compound with the natural drift across the optical field produced by the horizontal motion of the instrument itself over the surface of the ground. Such a method of measuring ground speeds is not very accurate principally due to the fact that the ground velocity to be derived depends on the evolution of the trigonometric tangent produced by the compounding of the respective velocity vectors.

In the present instance, however, a null method is employed which does away with the above inaccuracies of evolution. Thus instead of producing a drift, the principal object of the invention is to nullify all objects of drift and particularly the effect of the natural drift due to the lateral translation of the device. For a given height therefore, it will at once follow that the ground speed is determinable by the speed of revolution necessary to be impressed upon the rotating prism.

In order to correct for varying heights above the ground, which naturally affect the speed with which the ground view appears to pass across the field of vision, the tachometer device measuring the revolutions of the rotating prism can be automatically adjusted. Thus, for purposes of this invention a gear multiplication or diminution can be employed. In the present instance this is automatically provided for by adjustably arranging a friction roller between two displaced engaging discs.

However, any other type of variable speed control can be employed offering a means for adjustably arranging the mechanical advantage.

In order more completely to disclose our present invention the following drawings are attached, in which;

Figure 1 represents a plan view of the instrument;

Figure 2 corresponds to a part sectional view of Figure 1 substantially along the line 2—2, Figure 3 similarly to Figure 2 corresponds to a part sectional view substantially along the line 3—3 of Figure 1.

Within a casing 1 a prism 2 is revolvably mounted within a telescope tube 3 through the latter of which it is aimed to view the ground or territory over which passage is being taken. A driving shaft 4 is coupled by means of a reduction gearing 5 to a friction disc or the like 6, eccentrically displaced from a second friction disc 7 or the like, between which is arranged a friction roller or the like 8, mounted adjustably on a screw member 9 which is hand controlled by the knob 10 through suitable gearing 11. As a consequence of the latter arrangement it is possible to secure any desired amount of rotative speed of the prism 2 by merely turning the knob 10. Thus, in operating the instrument the telescope 3 is directed perpendicularly toward the ground or territory passed over, and such a speed is impressed upon the prism that when viewed from the eye-piece of the telescope 3 the ground will appear to remain substantially stationary.

In order to measure the required speed of rotation of the prism, to give the substantially stationary effect a further roller 12 is provided to engage with the disc member 7 so as to give rotativity to a further friction disc 13 or the like, by virtue of a mechanical train 14. It is the disc 13, which virtually impresses upon the tachometer the mechanical train, schematically represented by 15 in the figures, the required rotativity to give a reading on the tachometer dial (see Figure 1) the noted ground speed in miles per hour for the assumed standard elevation of the instrument from the ground.

In view of the fact that at higher distances from the earth's surface the ground appears to be traversing the optical field at less and less speed, it is advisable to automatically correct for this effect, by introducing a variable speed drive between the actuated disc 13 synchronously operating in fixed ratio with respect to the prism disc 7 on the one hand, and on the other hand with the train symbolized by 15 actuating the tachometer. For this purpose, therefore, engaging with the disc 13 is provided a friction roller or the like 17 adjustably mounted on a spindle 18, whose fixed pinion 19 engages with a tachometer train 19. In order to produce this adjustability a movable rack 20 is mounted in the casing of the instrument so that through a fixedly mounted pinion drive 21, 22 engagement is made with a movable sleeve 23 having a rack 24 on one side, capable of moving the friction roller 17 with respect to a spline formed integrally on the spindle 18 so as to alter the position of the roller with respect to the engaged surface of the disc 13. A portion of the rack 20 is adjustably controlled from the outside of the instrument by means of a knurled button or knob 25 mounted threadwise on the extension 20' of the rack with a bracket 26 supporting the knob and only allowing of rotating and not translation.

In operation a suitable motor, not shown, needs to be provided for giving a fixed speed or rotation to the shaft 4. Thereafter, the knob 25 is adjusted for altitude fixing the proper speed ratio for the tachometer drive. Then on directing the telescope of the instrument toward the ground, with the axes of rotation of the prism, transverse to the direction of travel, the speed adjusting knob 10 is turned whether to right or left to give suitable prism speed to cause the optical field to appear substantially stationary. With proper adjustments thus arrived at the tachometer will register on its dial 16 the proper ground speeds of the operator.

Having described the nature of our invention what we claim is:

1. In combination with a viewing piece, a prism, means for rotating said prism in the field of said viewing piece to produce a substantially stationary field of view, and means to determine the speed of rotation of said prism, and means between the said prism and the said speed determining means shiftable in accordance with altitude to alter the indicated speed of the said prism.

2. In combination with a viewing piece, a prism, means for rotating said prism at variable speeds from a constant speed source, in the field of said viewing piece, to produce a substantially stationary field of view, and means to determine the speed of rotation required to produce such field of view, and means between the said prism and the said speed determining means shiftable in accordance with altitude to alter the indicated speeds of the said prism.

3. In combination with a viewing piece, a prism, means for rotating said prism from a constant speed source, in the field of said viewing piece to produce a substantially stationary field of view, tachometer means to determine the required speed of rotation, further means for adjustably altering the speed effect on said tachometer means to correct for altitude of said viewing piece and means between the said prism and the said speed determining means shiftable in accordance with altitude to alter the indicated speed of said prism.

4. In combination with a rotatable viewing prism and a rotating means therefor, means to vary the speed of rotation of said prism to any required degree from said rotating means, a tachometer means driven by said rotating means at a speed having a given ratio to the speed of rotation of said prism and means longitudinally shiftable in accordance with altitude to variably affect said tachometer means by altering the ratio of speeds of rotation of said tachometer means and said prism.

FRANKLIN L. HUNT.
ROY C. SYLVANDER.